United States Patent

Chan

(10) Patent No.: US 8,734,912 B2
(45) Date of Patent: May 27, 2014

(54) METHOD FOR PATTERNING SUBSTRATE AND METHOD FOR FABRICATING CAPACITIVE TOUCH PANEL

(75) Inventor: Winston Chan, Hong Kong (HK)

(73) Assignee: Winsky Technology Limited, Hong Kong (HK)

( * ) Notice: Subject to any disclaimer, the term of this patent is extended or adjusted under 35 U.S.C. 154(b) by 171 days.

(21) Appl. No.: 13/046,318

(22) Filed: Mar. 11, 2011

(65) Prior Publication Data

US 2011/0236597 A1 Sep. 29, 2011

(30) Foreign Application Priority Data

Mar. 25, 2010 (TW) ................................ 99109031 A

(51) Int. Cl.
 *B05D 3/00* (2006.01)
(52) U.S. Cl.
 USPC .......................................... 427/555; 427/554
(58) Field of Classification Search
 USPC .......................................... 427/555, 554, 553
 See application file for complete search history.

(56) References Cited

U.S. PATENT DOCUMENTS

| 8,134,527 | B2 | 3/2012 | Chien et al. |
| 8,643,607 | B2 | 2/2014 | Suzuki et al. |
| 2002/0195435 | A1* | 12/2002 | Nagarkar et al. ......... 219/121.73 |
| 2008/0129317 | A1* | 6/2008 | Oba ............................. 324/663 |

FOREIGN PATENT DOCUMENTS

| CN | 101553776 | 10/2009 |
| KR | 10-2000-0059089 | 10/2000 |
| KR | 10-0940239 | 2/2010 |
| TW | 200947037 | 11/2009 |
| TW | 201000966 | 1/2010 |
| WO | WO 2011048347 A1 * | 4/2011 |

* cited by examiner

*Primary Examiner* — Dah-Wei D Yuan
*Assistant Examiner* — Nga Leung V Law
(74) *Attorney, Agent, or Firm* — Hamre, Schumann, Mueller & Larson, P.C.

(57) ABSTRACT

A method for patterning a substrate is presented, which includes the following steps. A conductive material is jet-printed onto a part of at least one side of the substrate. A surface of the at least one side of the substrate is imprinted with a laser to pattern a first conductive pattern. By using the method, the process can be simplified and substrates of a touch panel can be integrated, so as to achieve an objective of decreasing the overall thickness of an electronic device.

16 Claims, 3 Drawing Sheets

(a)

(b)

(c)

(d)

(e)

METHOD FOR PATTERNING SUBSTRATE AND METHOD FOR FABRICATING CAPACITIVE TOUCH PANEL

FIELD OF THE INVENTION

The present invention relates to a method for patterning a circuit substrate, and more particularly to a method for dry-patterning a circuit substrate.

DESCRIPTION OF THE PRIOR ART

As shown in FIG. 1, in a conventional capacitive touch panel, in addition to a liquid crystal and a color filter, at least an extra glass substrate 101 is needed for a touch circuit. Indium tin oxide (ITO) 102 having a strip pattern is provided at two sides of the glass substrate, and the upper and lower layers of the ITO 102 are perpendicularly arranged. A metal wire 103 is formed at a side of the glass substrate 101. The formation of the ITO electrodes and the metal wire 103 is a key factor that influences fabrication cost and quality in the process of forming the touch panel.

FIG. 2 shows a conventional method for fabricating a touch circuit in a touch panel. In the conventional method, a circuit is formed by wet-etching. Firstly, a glass substrate formed with ITO at two sides is cleaned. Next, as shown in Step (a), a photoresist is applied onto the ITO at a first side of the substrate and pre-baked. As shown in Step (b), mask exposure is performed on the photoresist. After a development process as shown in Step (c), the photoresist is overall applied onto the ITO at a second side of the glass substrate opposite to the first side, so as to protect the ITO at the second side of the glass substrate. Subsequently, as shown in Step (d), the glass substrate is immersed in an etchant, so as to remove the undesired ITO at the first side of the substrate. Afterward, as shown in Step (e), the photoresist at the two sides of the substrate is removed, and a first circuit at the first side of the glass substrate is formed.

Next, the method for patterning the ITO at the first side of the glass substrate is repeated to pattern the ITO at the second side of the substrate, so as to form a second circuit at the second side of the substrate.

In the conventional wet-etching process, the steps of applying the photoresist and removing the photoresist need to be performed twice. If a liquid crystal or a color filter is already formed at a side of the substrate, the steps of applying the photoresist and immersing in the etchant may cause damage to the liquid crystal or the color filter. Thus, in the conventional method for fabricating the touch panel, the touch circuit and the liquid crystal or the color filter need to be formed on different substrates and then the substrate having the touch circuit is combined with the substrate having the liquid crystal or the color filter.

The popularity of lightweight, compact electronic devices drives industrial demand for ever-smaller, lighter and thinner components. However, the conventional wet-etching process increases the complexity of integrating the substrates. The conventional wet-etching process of forming the circuit on the glass substrate having the ITO is not only time consuming, labor intensive, and environmentally harmful, but it also increases the overall thickness of the electronic device. Therefore, there is urgent need for a method capable of simplifying the process and reducing the number of required substrates.

SUMMARY OF THE INVENTION

The present invention is directed to a method for patterning a substrate, and more particularly to a dry process, in which elements can be arranged at two sides of the substrate, so as to reduce the number of required substrates for the electronic device and further decrease the overall thickness of the electronic device.

In an embodiment, the present invention provides a method for patterning a substrate, which includes the following steps. A conductive material is jet-printed onto a part of at least one side of the substrate. A surface of the at least one side of the substrate is imprinted with a laser to pattern a first conductive pattern.

In another embodiment, the present invention provides a method for fabricating a capacitive touch panel, which includes the following steps. A substrate is provided. A conductive material is jet-printed onto a part of at least one side of the substrate. A surface of the at least one side of the substrate is imprinted with a laser to pattern a first conductive pattern.

DETAILED DESCRIPTION

Figure 1A:
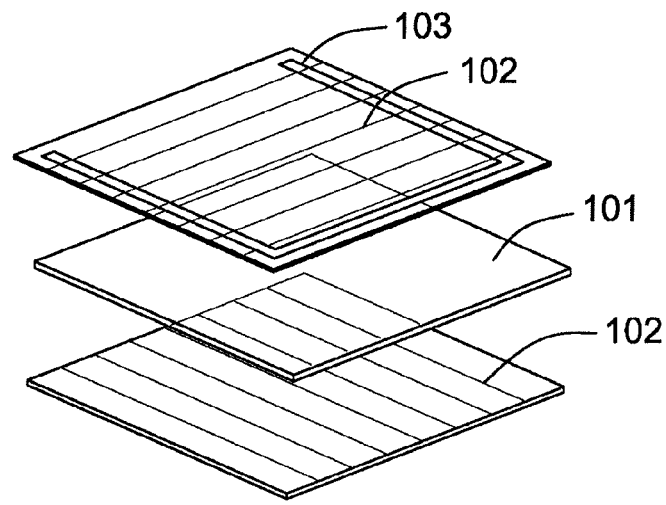
FIG. 1A shows a structure of a conventional capacitive touch panel.
Figure 1B:
FIG. 1B shows a conventional method for patterning an ITO substrate.
Figure 1B:
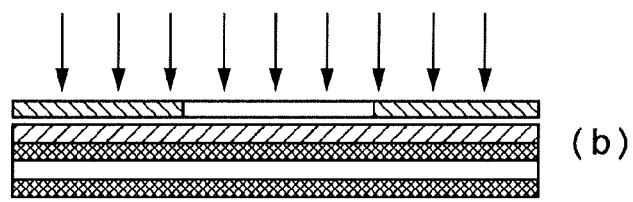
Figure 1B:
Figure 1B:
Figure 1B:
Figure 1B:
Figure 2:
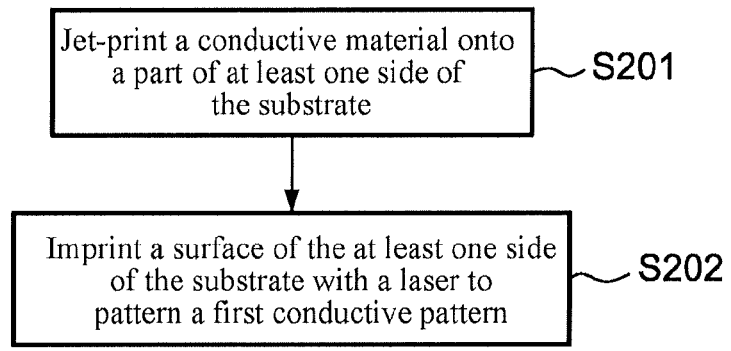
FIG. 2 is a flow chart of a method for patterning an ITO substrate according to the present invention.

FIG. 2 is a flow chart of a method for patterning an ITO substrate according to the present invention. Firstly, in Step S201, a conductive material is jet-printed onto a part of at least one side of a substrate. Next, in Step S202, a surface of the at least one side of the substrate is imprinted with a laser to pattern a first conductive pattern. Through the method of the present invention, the conventional wet process is simplified, environmental pollution is decreased, and the number of required substrates is reduced.

Figure 3A:
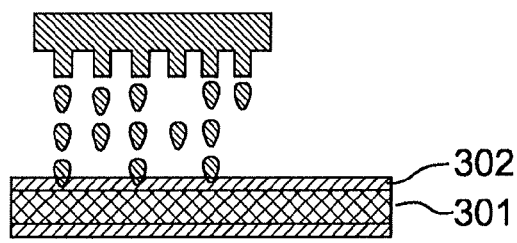
FIGS. 3A to 3D show a method for dry-patterning an ITO substrate according to the present invention.
Figure 3B:
Figure 3C:

FIGS. 3A to 3C show a method for patterning a substrate according to another preferred embodiment of the present invention. As shown in FIG. 3A, a conductive material is jet-printed onto at least one surface of a substrate 301. The substrate 301 may be a glass substrate, a plastic substrate, or a silicon substrate. Next, as shown in FIG. 3B, the conductive material is jet-printed onto the substrate, so as to form a conductive pattern (for example, a metal rim 303) at a side of the substrate 301. The conductive material may be silver colloid, conductive carbon, an organic conductive material, nano-metal particles, or ink containing other conductive materials.

In another embodiment, a color filter, a liquid crystal, or a circuit is already formed at the other side of the substrate, so that the process of jet-printing a pattern may not cause damage to the color filter, the liquid crystal, or the circuit at the other side, and the color filter, the liquid crystal, or the pre-formed circuit and the circuit that is to be formed according to the present invention may also be implemented on the same substrate, so as to achieve the objective of reducing the number of substrates.

In another preferred embodiment, ITO 302 is provided at a side of the substrate 301, or at two sides of the substrate. The ITO is formed on the substrate by sputtering or screen-printing.

In a preferred embodiment, the conductive material is a material that is sensitive to a specific wavelength and is capable of absorbing energy of a light source of the specific wavelength. For example, the conductive material may absorb ultraviolet (UV) light or far-infrared light. As shown in FIG. 3C, excessive solvent in the metal rim 303 may be volatilized through an additional heat treatment, so as to further cure the pattern formed of the conductive material.

Figure 3D:
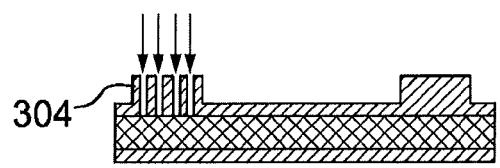

FIG. 3D shows formation of a conductive pattern 304 using the conductive material jet-printed on the substrate 301 through laser imprinting: that is, formation of a required circuit. In an embodiment of the present invention, the circuit may be a sensing circuit, a driving circuit, or electrodes. In another embodiment, the method of the present invention may be applied to form a touch panel; for example, a capacitive touch panel.

Figure 4:
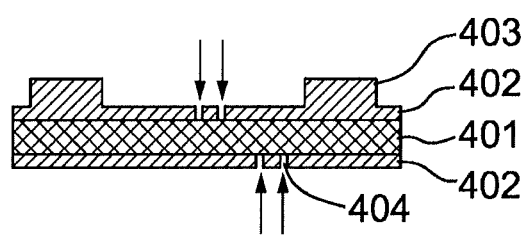
FIG. 4 shows patterning of ITO on a glass substrate through laser imprinting.

In another preferred embodiment, as shown in FIG. 4, ITO 402 on a substrate 401 absorbs energy of a laser wavelength, and the undesired ITO 402 is removed to form a required conductive pattern 404. In an embodiment, the method is used for fabricating a touch panel. The formed circuit may be a sensing circuit, a driving circuit, or electrodes of the touch panel. In another embodiment of the present invention, the jet-printed conductive material may also form a metal rim 403.

Figure 5:
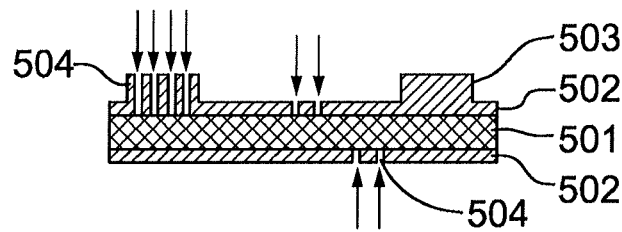
FIG. 5 shows patterning of ITO and a conductive pattern that is jet-printed in advance on the glass substrate through laser imprinting.

FIG. 5 shows another embodiment. On a glass substrate 501 provided with ITO 502, a conductive material is jet-printed onto the ITO 502, in which formation of a metal rim 503 is included. The jet-printed conductive material and the ITO formed on the substrate can be patterned at the same time through laser imprinting. The conductive material and the ITO absorb energy of a laser wavelength, and undesired areas are removed to form a conductive pattern 504; that is, to form a required circuit.

The laser imprinting may be performed at a single side or at both upper and lower sides of the substrate at the same time. As shown in FIGS. 4 and 5, not only is processing time saved, but also circuits can be formed at both the upper and lower sides of the substrate, so that the number of substrates in the electronic device is reduced. According to the technology of the present invention, the process is effectively simplified, environmental pollution is reduced, and the substrates required for the touch panel are integrated, so as to decrease the overall thickness of the electronic device.

Although the technical solutions and features of the present invention are described as above, persons skilled in the art can make variations and modifications without departing from the teachings and disclosed contents of the present invention. Thus, the scope of the present invention is not limited to the disclosed embodiments but includes other variations and modifications without departing from the present invention as defined by the appended claims.

I claim:

1. A method for patterning a substrate, comprising:
   jet-printing a conductive material onto a part of at least one side of the substrate;
   imprinting a surface of the at least one side of the substrate with a laser to pattern a first conductive pattern; and
   forming a color filter or a liquid crystal on a second side of the substrate opposite to the at least one side of the substrate, prior to formation of the first conductive pattern,
   wherein the first conductive pattern is a sensing circuit or a driving circuit.

2. The method according to claim 1, wherein the substrate is a glass substrate.

3. The method according to claim 1, wherein indium tin oxide (ITO) is provided on the surface of the at least one side of the substrate.

4. The method according to claim 1, wherein the conductive material comprises at least one selected from the group consisting of: nano-metal particles, silver colloid, conductive carbon, and an organic conductive material.

5. The method according to claim 3, wherein the patterning of the first conductive pattern comprises etching away the undesired ITO and conductive material, so as to pattern the conductive material and the ITO through laser photo-etching.

6. The method according to claim 1, further comprising forming a second conductive pattern on the surface of the at least one side of the substrate.

7. The method according to claim 1, further comprising curing the conductive material.

8. The method according to claim 6, wherein the second conductive pattern is a metal rim.

9. A method for fabricating a capacitive touch panel, comprising:
   providing a substrate;
   jet-printing a conductive material onto a part of at least one side of the substrate;
   imprinting a surface of the at least one side of the substrate with a laser to pattern a first conductive pattern; and
   forming a color filter or a liquid crystal on a second side of the substrate opposite to the at least one side of the substrate, prior to formation of the first conductive pattern,
   wherein the first conductive pattern is a sensing circuit or a driving circuit.

10. The method according to claim 9, wherein the substrate is a glass substrate.

11. The method according to claim 9, wherein indium tin oxide (ITO) is provided on the surface of the at least one side of the substrate.

12. The method according to claim 9, wherein the conductive material comprises at least one selected from the group consisting of: nano-metal particles, silver colloid, conductive carbon, and an organic conductive material.

13. The method according to claim 11, wherein the patterning of the first conductive pattern comprises etching away the undesired ITO and conductive material, so as to pattern the conductive material and the ITO through laser photo-etching.

14. The method according to claim 9, further comprising forming a second conductive pattern on the surface of the at least one side of the substrate.

15. The method according to claim 9, further comprising curing the conductive material.

16. The method according to claim 14, wherein the second conductive pattern is a metal rim.

* * * * *